US012474656B2

(12) United States Patent
Tanaka et al.

(10) Patent No.: US 12,474,656 B2
(45) Date of Patent: Nov. 18, 2025

(54) FILM, TUBULAR FIXING MEMBER, FIXING DEVICE, AND IMAGE FORMING APPARATUS

(71) Applicant: FUJIFILM BUSINESS INNOVATION CORP., Tokyo (JP)

(72) Inventors: Hiroaki Tanaka, Kanagawa (JP); Taiki Nagamatsu, Kanagawa (JP); Kenji Kajiwara, Kanagawa (JP); Tomotake Inagaki, Kanagawa (JP); Ryohei Yoshikawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/624,642

(22) Filed: Apr. 2, 2024

(65) Prior Publication Data

US 2025/0085652 A1 Mar. 13, 2025

(30) Foreign Application Priority Data

Sep. 13, 2023 (JP) ................................ 2023-148777

(51) Int. Cl.
*G03G 15/20* (2006.01)

(52) U.S. Cl.
CPC ....... *G03G 15/206* (2013.01); *G03G 15/2057* (2013.01); *G03G 2215/2054* (2013.01)

(58) Field of Classification Search
CPC ............ G03G 15/206; G03G 15/2057; G03G 2215/2054; G03G 15/2053; G03G 2215/2009; G03G 2215/2016
See application file for complete search history.

(56) References Cited

U.S. PATENT DOCUMENTS

| | | | | |
|---|---|---|---|---|
| 2010/0279045 | A1 | 11/2010 | Nakajima et al. | |
| 2012/0269560 | A1 | 10/2012 | Sakakibara | |
| 2014/0133892 | A1* | 5/2014 | Miura | G03G 15/2057 428/421 |
| 2017/0038707 | A1* | 2/2017 | Matsunaka | G03G 15/206 |
| 2018/0120745 | A1 | 5/2018 | Takagi et al. | |
| 2023/0251596 | A1 | 8/2023 | Yamasaki et al. | |

FOREIGN PATENT DOCUMENTS

| | | | |
|---|---|---|---|
| JP | 3558548 | B2 | 8/2004 |
| JP | 2016-065918 | A | 4/2016 |
| JP | 6438701 | B2 | 12/2018 |
| JP | 7135825 | B2 | 9/2022 |

OTHER PUBLICATIONS

Sep. 20, 2024 Extended European Search Report issued in European Patent Application No. 24168906.6.
Jun. 26, 2025 Office Action issued in European Application No. 24168906.6.

* cited by examiner

*Primary Examiner* — Sandra Brase
(74) *Attorney, Agent, or Firm* — Oliff PLC

(57) ABSTRACT

A film contains at least one macromolecular compound selected from the group consisting of resins and rubbers and an electrically conductive filler including at least a needle-shaped filler and dispersed in the macromolecular compound. The content of the electrically conductive filler is 40% by volume or more.

17 Claims, 3 Drawing Sheets

FILM, TUBULAR FIXING MEMBER, FIXING DEVICE, AND IMAGE FORMING APPARATUS

CROSS-REFERENCE TO RELATED APPLICATIONS

This application is based on and claims priority under 35 USC 119 from Japanese Patent Application No. 2023-148777 filed Sep. 13, 2023.

BACKGROUND

(i) Technical Field

The present disclosure relates to a film, a tubular fixing member, a fixing device, and an image forming apparatus.

(ii) Related Art

Japanese Patent No. 6438701 discloses a "heat dissipating rubber composition containing: 100 parts by weight of a polymer component; 400 to 600 parts by weight of an inorganic filler having a thermal conductivity of 5 to 80 W/m·K and a volume resistivity of $10^{10}$ Ω·cm or more; 3 to 30 parts by weight of a heat conductive-electrically conductive filler having a thermal conductivity of 100 to 300 W/m·K and a volume resistivity of $10^{-3}$ to $10^{-6}$ Ω·cm; and 20 to 40 parts by weight of tetrapod-shaped zinc oxide whiskers."

Japanese Patent No. 3558548 discloses a "resin formed article including a skeleton portion and a resin portion formed integrally with part of the skeleton portion or the entire skeleton portion, wherein the difference in thermal conductivity between the skeleton portion and the resin portion is 1 W/mK or more and wherein the volume resistivity of the skeleton portion and/or the resin portion is 1 MΩ·cm or less (not including 0)."

Japanese Patent No. 7135825 discloses a "resin composition containing a thermoplastic resin, carbon fibers, and an electrically conductive filler, wherein the electrically conductive filler is distributed in the thermoplastic resin so as to form a network pattern."

SUMMARY

Aspects of non-limiting embodiments of the present disclosure relate to a film having higher thermal conductivity in its thickness direction than a film in which the electrically conductive filler includes no needle-shaped filler or a film in which the content of the electrically conductive filler is less than 40% by volume and also relate to a tubular fixing member including the above film, a fixing device, and an image forming apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a film containing at least one macromolecular compound selected from the group consisting of resins and rubbers and an electrically conductive filler including at least a needle-shaped filler and dispersed in the macromolecular compound, wherein the content of the electrically conductive filler is 40% by volume or more.

BRIEF DESCRIPTION OF THE DRAWINGS

Exemplary embodiments of the present disclosure will be described in detail based on the following figures, wherein.

DETAILED DESCRIPTION

Figure 1:
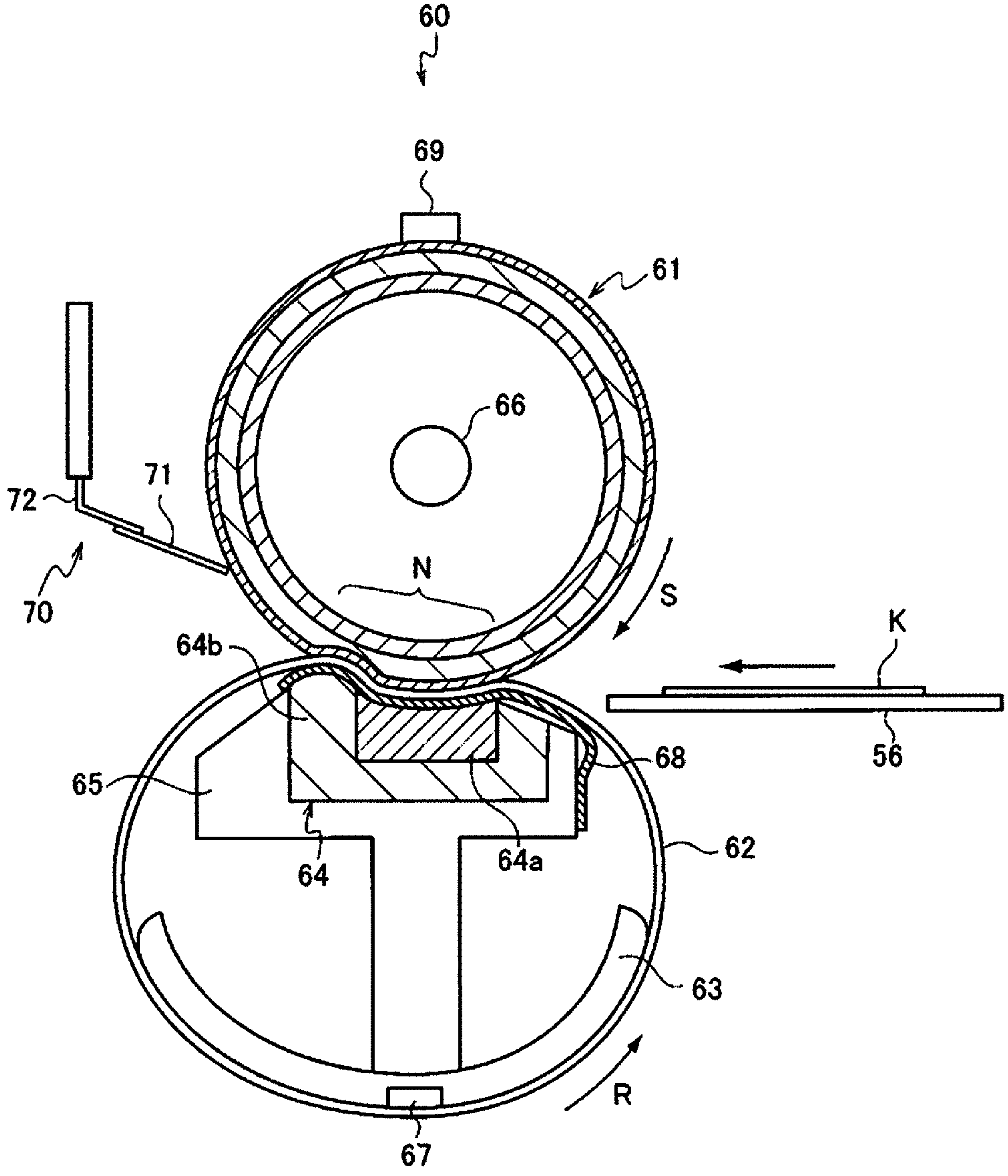
FIG. 1 is a schematic illustration showing a first exemplary embodiment of a fixing device according to an exemplary embodiment of the disclosure.

Exemplary embodiments of the present disclosure will be described below. The description and Examples are illustrative of the exemplary embodiments and are not intended to limit the scope of the exemplary embodiments.

In the present disclosure, a numerical range represented using "to" means a range including the numerical values before and after the "to" as the minimum value and the maximum value, respectively.

In a set of numerical ranges expressed in a stepwise manner in the present disclosure, the upper or lower limit in one numerical range may be replaced with the upper or lower limit in another numerical range in the set. Moreover, in a numerical range described in the present disclosure, the upper or lower limit in the numerical range may be replaced with a value indicated in an Example.

In the present disclosure, the term "step" is meant to include not only an independent step but also a step that is not clearly distinguished from other steps, so long as the prescribed purpose of the step can be achieved.

When an exemplary embodiment in the present disclosure is explained with reference to the drawings, the structure of the exemplary embodiment is not limited to the structures shown in the drawings. In the drawings, the sizes of the components are conceptual, and the relative relations between the components are not limited to those shown in the drawings.

In the present disclosure, any component may contain a plurality of materials corresponding to the component. In the present disclosure, when reference is made to the amount of a component in a composition, if the composition contains a plurality of materials corresponding to the component, the amount means the total amount of the plurality of materials in the composition, unless otherwise specified.

In the present disclosure, the "axial direction" of a tubular member means the direction in which the rotation axis of the tubular member extends, and the "circumferential direction" of the tubular member means the rotation direction of the tubular member.

<Film>

A film according to an exemplary embodiment of the present disclosure contains at least one macromolecular compound selected from the group consisting of resins and rubbers and an electrically conductive filler including at least a needle-shaped filler and dispersed in the macromolecular compound. The content of the electrically conductive filler is 40% by volume or more.

The film according to the present exemplary embodiment of the disclosure has the structure described above, and its thermal conductivity in the thickness direction is high. The reason that this effect is obtained may be as follows.

The film according to the present exemplary embodiment of the disclosure contains a large amount, as much as 40% by volume or more, of the electrically conductive filler including at least the needle-shaped filler. Therefore, particles of the electrically conductive filler contained in a large amount are not aligned in one direction but are randomly dispersed in the macromolecular compound so as to be oriented in various directions. Since the electrically conductive filler particles are dispersed so as to be oriented in various directions, the electrically conductive filler particles form heat conduction paths in the macromolecular compound. This may be the reason that the thermal conductivity in the thickness direction of the film is high.

Next, the components included in the film according to the present exemplary embodiment of the disclosure will be described.

(Electrically Conductive Filler)

Content of Electrically Conductive Filler

The film according to the present exemplary embodiment of the disclosure contains the electrically conductive filler including at least the needle-shaped filler, and the content of the electrically conductive filler in the film is 40% by volume or more. Since the content of the electrically conductive filler is 40% by volume or more, the film obtained has high thermal conductivity in the thickness direction. The content of the electrically conductive filler in the film is more preferably 50% by volume or more and still more preferably 60% by volume or more.

From the viewpoint of increasing the flexibility and durability of the film, the lower limit of the content of the electrically conductive filler in the film is preferably 80% by volume or less and more preferably 70% by volume or less.

Shape of Electrically Conductive Filler Particles

In the film according to the present exemplary embodiment of the disclosure, the electrically conductive filler includes at least the needle-shaped filler. The electrically conductive filler particles dispersed randomly in the macromolecular compound so as to be oriented in various directions include at least needle-shaped filler particles having an elongated shape. In this case, good heat conduction paths are formed in the macromolecular compound, and high thermal conductivity is obtained in the thickness direction of the film.

In the film according to the present exemplary embodiment of the disclosure, the electrically conductive filler may include, in addition to the needle-shaped filler, at least one of a spherical filler and a plate-shaped filler. When the electrically conductive filler further includes at least one of the spherical filler and the plate-shaped filler, the formation of the heat conduction paths in the macromolecular compound is further facilitated, and the high thermal conductivity in the thickness direction of the film is more easily obtained.

When the film contains at least one of the spherical filler and the plate-shaped filler, the total amount of the spherical filler and the plate-shaped filler with respect to the total amount of the electrically conductive filler is preferably 20% by volume or more and 60% by volume or less, more preferably 25% by volume or more and 55% by volume or less, and still more preferably 30% by volume or more and 50% by volume or less, from the viewpoint of obtaining the high thermal conductivity in the thickness direction of the film more easily.

The shape of the filler particles will be described. In one filler particle, the direction in which the filler particle has the longest length is defined as an X axis. Among the directions orthogonal to the X axis, the direction in which the filler particle has the longest length is defined as a Y axis. The direction orthogonal to both the X and Y axes is defined as a Z axis. The length (z) of each filler particle along the Z axis is set to 1.0. Then filler particles in which the ratio (x:y:z) of the filler lengths along the X, Y, and Z axes is in one of the following ranges are defined as follows.

Needle-shaped filler: x:y:z=3.0 or more:1.0 or more and less than 3.0:1.0

Plate-shaped filler: x:y:z=3.0 or more:3.0 or more:1.0

Spherical filler: x:y:z=1.0 or more and less than 3.0:1.0 or more and less than 3.0:1.

Method for Determining Content of Electrically Conductive Filler in Film

A method for determining the content of the electrically conductive filler in the film will be described.

First, a cuboidal piece is cut from a central portion, with respect the axial direction, of the film. The cuboidal piece has edges extending in the axial direction, the circumferential direction, and the thickness direction, has a length of 1 mm in the circumferential direction, and is elongated in the axial direction. Then the cuboidal piece is embedded in an epoxy resin. The embedded piece is subjected to cross-sectional processing using a microtome to form a block cross section at which a cross section in the thickness direction appears. The specimen having the block cross section formed therein is fixed to a specimen table of an FIB-SEM apparatus (FIB-SEM Helios NanoLab 600i, U.S. FEI Company) and subjected to vapor deposition treatment. In the FIB-SEM apparatus, the FIB processing and the SEM observation of the block cross section are repeated to obtain a 2D image stack. The FIB processing and the SEM observation are repeated until at least 30 filler particles are observed. The SEM observation is performed at a magnification at which filler particles dispersed in the film can be observed.

The 2D image stack is analyzed using 3D image analysis software (Avizo-Fire, VSG) to form a 3D image. Then whether the electrically conductive filler particles included in the 3D image formed are needle-shaped filler particles, spherical filler particles, or plate-shaped filler particles is determined (i.e., the ratio of the lengths along the X, Y, and Z axes of each particle is determined). Moreover, the contents (% by volume) of the needle-shaped filler, the spherical filler, and the plate-shaped filler are determined.

The average fiber length of the needle-shaped filler described later is determined as follows. In the 3D image formed, the length of the longest portion (in the X axis direction) of each of the needle-shaped filler particles is determined, and the arithmetic mean of the lengths determined is computed.

The average particle diameter of the spherical filler and the average particle diameter of the plate-shaped filler are determined as follows. In the 3D image formed, the equivalent area diameters of the spherical filler particles and the plate-shaped filler particles are determined, and the arithmetic means of the equivalent area diameters are computed.

Material of Electrically Conductive Filler

From the viewpoint of the thermal conductivity, the material of the electrically conductive filler may be at least one selected from the group consisting of carbon materials, ceramic materials, and metal oxide materials. In particular, from the viewpoint that high thermal conductivity can be easily obtained in the thickness direction of the film, the material of the electrically conductive filler may be a carbon material, and the material of the needle-shaped filler may be a carbon material.

Examples of the electrically conductive filler formed of a carbon material include carbon fibers such as carbon nanofibers and carbon nanotubes, graphite particles, and plate-shaped graphite.

Examples of the electrically conductive filler formed of a ceramic material include ceramic fibers, ceramic particles, and plate-shaped ceramics made of aluminum nitride, boron nitride, silicon carbide, etc.

Examples of the electrically conductive filler formed of a metal oxide material include needle-shaped metal oxides, metal oxide particles, and plate-shaped metal oxides made of alumina, boehmite (alumina monohydrate), silica, titania, zirconia, magnesium oxide, tin oxide, zinc oxide, barium oxide, etc.

Particle Diameter of Electrically Conductive Filler

From the viewpoint of dispersibility in the film, the average fiber length (the average length (in the X axis direction) of the longest portions) of the needle-shaped filler particles contained in the film according to the present exemplary embodiment of the disclosure is preferably 1 μm or more and 10 μm or less and more preferably 2 μm or more and 8 μm or less.

When the film according to the present exemplary embodiment of the disclosure contains at least one of the spherical filler and the plate-shaped filler, the average particle diameter of the spherical filler and the average particle diameter of the plate-shaped filler are preferably 5 μm or more and 20 μm or less and more preferably 8 μm or more and 18 μm or less, from the viewpoint of the dispersibility in the film.

(Macromolecular Compound)

Type of Macromolecular Compound

The film according to the present exemplary embodiment of the disclosure contains at least one macromolecular compound selected from the group consisting of resins and rubbers. Examples of the macromolecular compound include resins such as polyimide resins, polyamide resins, polyamide-imide resins, thermotropic liquid crystal polymers, fluorocarbon resins, and silicone resins and rubbers such as fluorocarbon rubbers, silicone rubbers, and fluorosilicone rubbers. One macromolecular compound may be used alone, or a mixture of two or more may be used. From the viewpoint of the heat resistance of the film, a polyimide resin is preferred.

From the viewpoint of the flexibility and durability of the film, the content (% by volume) of the macromolecular compound contained in the film is preferably 20% by volume or more and 60% by volume or less and more preferably 30% by volume or more and 40% by volume or less.

(Physical Properties of Film)

From the viewpoint of obtaining high thermal conductivity in the thickness direction of the film, the volume resistivity of the film according to the present exemplary embodiment of the disclosure that is measured at a measurement voltage of 0.1 V is preferably 1,000 ohm·cm or less, more preferably 800 ohm·cm or less, and still more preferably 600 ohm·cm or less. The lower limit of the volume resistivity measured at a measurement voltage of 0.1 V is preferably 100 ohm·cm or more, more preferably 200 ohm·cm or more, and still more preferably 400 ohm·cm or more.

From the viewpoint of obtaining high thermal conductivity in the thickness direction of the film, the applied voltage dependence of the volume resistivity of the film according to the present exemplary embodiment of the disclosure (i.e., the difference between the volume resistivity measured at a measurement voltage of 0.02 V and the volume resistivity measured at a measurement voltage of 0.1 V) is preferably 600 ohm·cm or less, more preferably 400 ohm·cm or less, still more preferably 300 ohm·cm or less, and even more preferably 250 ohm·cm or less. The lower limit of the applied voltage dependence of the volume resistivity may be, for example, 0 ohm·cm, 10 ohm·cm or more, or 50 ohm·cm or more.

From the viewpoint of obtaining high thermal conductivity in the thickness direction of the film, the applied voltage dependence of the surface resistivity of the film according to the present exemplary embodiment of the disclosure (i.e., the difference between the surface resistivity measured at a measurement voltage of 0.02 V and the surface resistivity measured at a measurement voltage of 0.1 V) is preferably 200 ohm/sq or more, more preferably 400 ohm/sq or more, and still more preferably 600 ohm/sq or more. The upper limit of the applied voltage dependence of the surface resistivity may be, for example, 2,000 ohm/sq or less, 1,500 ohm/sq or less, or 1,000 ohm/sq or less.

A method for measuring the volume resistivity and surface resistivity of the film will be described.

The volume resistivity and the surface resistivity are measured using R8340A manufactured by Advantest as an ammeter and a UR-SS probe as a measurement probe at measurement voltages of 0.1 V and 0.02 V.

The average thickness of the film according to the present exemplary embodiment of the disclosure may be set according to its intended application and may be, for example, 10 μm or more and 1000 μm or less, 15 μm or more and 800 μm or less, or 20 μm or more and 500 μm or less.

The film according to the present exemplary embodiment of the disclosure may be a flat film or may be a tubular film. Examples of the application of the film according to the present exemplary embodiment of the disclosure include sheets disposed in electronic apparatuses for the purpose of heat absorption and heat dissipation and tubular fixing members of image forming apparatuses.

(Method for Producing Film)

Examples of a method for producing the film according to the present exemplary embodiment of the disclosure include a production method in which the following steps (1) to (3) are sequentially performed.

Step (1): The macromolecular compound and the electrically conductive filler are mixed to prepare a coating solution. If necessary, a solvent or a dispersion medium is also mixed.

Step (2): The coating solution is applied to a substrate and dried to form a coating.

Step (3): The coating is fired to obtain a film.

When the substrate in the step (2) is a cylindrical mold, a tubular film can be produced.

<Tubular Fixing Member>

A tubular fixing member according to the present exemplary embodiment of the disclosure includes the film according to the present exemplary embodiment of the disclosure.

The tubular fixing member according to the present exemplary embodiment of the disclosure may be a member including only the film according to the present exemplary embodiment of the disclosure, may be a member including the film according to the present exemplary embodiment of the disclosure and another film that are stacked together, or may be a member including a plurality of the films according to the present exemplary embodiment of the disclosure that are stacked together. When a plurality of the films according to the present exemplary embodiment of the disclosure are stacked together, the components and compositions of the plurality of films may be the same or different.

From the viewpoint of durability and thermal conductivity, the average thickness of each film included in the tubular fixing member is preferably 20 μm or more and 300 μm or less, more preferably 30 μm or more and 250 μm or less, and still more preferably 40 μm or more and 200 μm or less.

The average thickness of each film included in the tubular fixing member is a value measured as follows. The thickness is measured using an eddy-current thickness meter at a total of 40 points. Specifically, 10 portions equally spaced in the axial direction of the tubular fixing member are used, and the measurement is performed at points spaced at 90° intervals in the circumferential direction in each of the portions. The average thickness is the arithmetic mean of the measured values.

The tubular fixing member according to the present exemplary embodiment of the disclosure may include a release layer serving as the outer circumferential surface on the outer circumferential side of the film according to the present exemplary embodiment of the disclosure.

The release layer may contain a heat-resistant release material. Examples of the heat-resistant release material include fluorocarbon resins, polyether ether ketone (PEEK), and polyphenylene sulfide (PPS). Examples of the fluorocarbon resins include tetrafluoroethylene/perfluoroalkyl vinyl ether copolymers (PFA), polytetrafluoroethylene (PTFE), tetrafluoroethylene/hexafluoropropylene copolymers (FEP), polyethylene/tetrafluoroethylene (ETFE), polyvinylidene fluoride (PVDF), polychlorotrifluoroethylene (PCTFE), and vinyl fluoride (PVF).

The release layer may contain various additives. Examples of the additives include fillers (such as calcium carbonate), functional fillers (such as alumina), softeners (such as paraffin), processing aids (such as stearic acid), antioxidants (such as amins), and crosslinking agents.

The average thickness of the release layer is preferably 5 μm or more and 30 μm or less, more preferably 10 μm or more and 25 μm or less, and still more preferably 15 μm or more and 20 μm or less.

Examples of the tubular fixing member according to the present exemplary embodiment of the disclosure include a tubular fixing member including a substrate layer, an elastic layer, and the release layer that are stacked in this order, wherein at least one of the substrate layer and the elastic layer is the film according to the present exemplary embodiment of the disclosure.

In a preferred mode of the above exemplary embodiment, the substrate layer is the film according to the present exemplary embodiment of the disclosure that contains a resin, and/or the elastic layer is the film according to the present exemplary embodiment of the disclosure that contains a rubber.

From the viewpoint of the durability and thermal conductivity, the average thickness of the substrate layer is preferably 20 μm or more and 200 μm or less, more preferably 30 μm or more and 150 μm or less, and still more preferably 40 μm or more and 100 μm or less.

From the viewpoint of the durability and thermal conductivity, the average thickness of the elastic layer is preferably 30 μm or more and 300 μm or less, more preferably 50 μm or more and 250 μm or less, and still more preferably 80 μm or more and 200 μm or less.

Examples of the shape of the tubular fixing member according to the present exemplary embodiment of the disclosure include cylindrical shapes and belt shapes.

The tubular fixing member according to the present exemplary embodiment of the disclosure may be a fixing belt or may by a fixing roller.

<Fixing Device>

A fixing device according to the present exemplary embodiment of the disclosure includes a first rotatable member and a second rotatable member disposed in contact with the outer surface of the first rotatable member, and a recording medium having a toner image formed on its surface is caused to pass through the contact portion between the first rotatable member and the second rotatable member to fix the toner image on the recording medium. At least one of the first rotatable member and the second rotatable member is a rotatable member for applying heat to the recording medium and is the tubular fixing member according to the present exemplary embodiment of the disclosure.

Examples of the fixing device according to the present exemplary embodiment of the disclosure include a first exemplary embodiment and a second exemplary embodiment.

A fixing device according to the first exemplary embodiment includes a heating roller and a pressurizing belt, and at least the heating roller is the tubular fixing member according to the present exemplary embodiment of the disclosure.

A fixing device according to the second exemplary embodiment includes a heating belt and a pressurizing roller, and at least the heating belt is the tubular fixing member according to the present exemplary embodiment of the disclosure.

First Exemplary Embodiment

FIG. 1 is a schematic illustration showing the fixing device 60 according to the first exemplary embodiment.

The fixing device 60 includes a heating roller 61 (an example of the first rotatable member) and a pressurizing belt 62 (an example of the second rotatable member).

A halogen lamp 66 (an example of heating means) is disposed inside the heating roller 61. A temperature sensing element 69 is disposed in contact with a surface of the heating roller 61. The halogen lamp 66 is turned on or off based on the temperature value measured by the temperature sensing element 69, and the surface temperature of the heating roller 61 is thereby maintained at a target temperature (e.g., 150° C.).

The pressing belt 62 is rotatably supported by a pressing pad 64 and a belt-running guide 63 that are disposed on the inner side of the pressing belt 62.

The pressing pad 64 presses the pressurizing belt 62 against the heating roller 61. The pressing belt 62 is pressed against the heating roller 61 by the pressing pad 64, and a nip part N (nipping portion) is thereby formed.

The pressing pad 64 includes a nipping member **64*a* and a nipping member 64*b*. The nipping member 64*a* is disposed on the entrance side of the nip part N to provide the large-width nip part N. The nipping member 64*b* is disposed on the exit side of the nip part N to distort the heating roller 61** in order for a recording medium to be easily released.

To reduce the sliding resistance between the inner circumferential surface of the pressing belt 62 and the pressing pad 64, a sheet-shaped sliding member 68 is disposed between the pressing pad 64 and the pressurizing belt 62. The pressing pad 64 and the sliding member 68 are held by a metallic holding member 65. The belt-running guide 63 is attached to the holding member 65. A lubricant supply device 67 that is means for supplying a lubricant (oil) to the inner circumferential surface of the pressing belt 62 is attached to the belt-running guide 63.

A release member 70 used as auxiliary means for releasing a recording medium from the fixing device 60 is disposed downstream of the nip part N. The release member 70 includes a release claw 71 and a holding member 72. The release claw 71 is held by the holding member 72 at a position close to the heating roller 61.

The heating roller 61 is driven to rotate by a driving motor (not illustrated). The heating roller 61 is rotated by the driving motor in the direction of an arrow S, and the pressing belt 62 is driven by the rotation of the heating roller 61 and rotates in the direction of an arrow R. A paper sheet K (an example of the recording medium) with an unfixed toner image placed thereon is guided by a guide 56 and transported to the nip part N. When the paper sheet K passes through the nip part N, the toner image on the paper sheet K is fixed by pressure and heat.

Second Exemplary Embodiment

Figure 2:
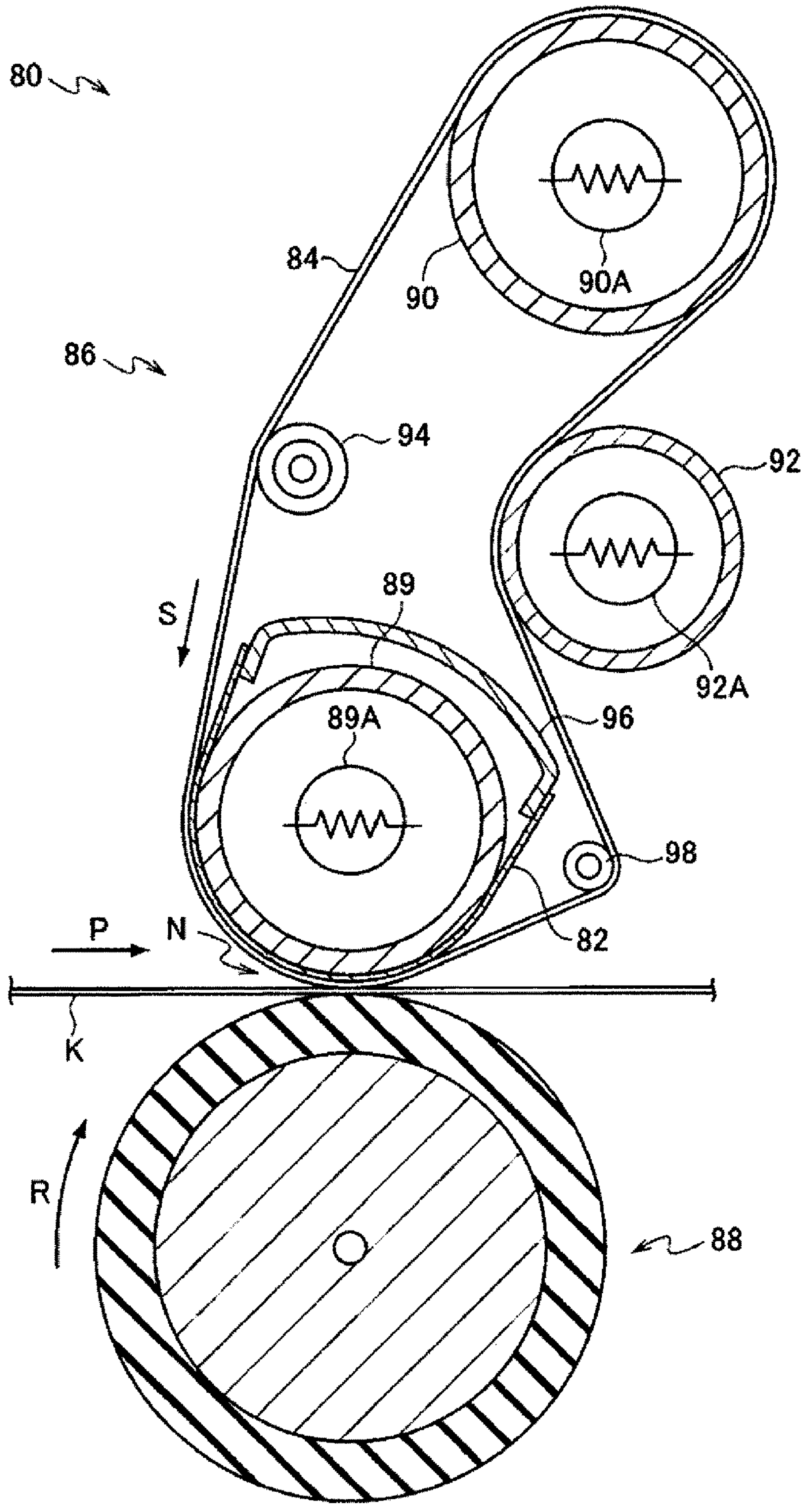
FIG. 2 is a schematic illustration showing a second exemplary embodiment of the fixing device according to the exemplary embodiment of the disclosure.

FIG. 2 is a schematic illustration showing the fixing device 80 according to the second exemplary embodiment.

The fixing device 80 includes: a fixing belt module 86 including a heating belt 84 (an example of the first rotatable member); and a pressurizing roller 88 (an example of the second rotatable member) disposed so as to be pressed against the heating belt 84 (the fixing belt module 86).

A nip part N (nipping portion) is formed at the contact portion between the heating belt 84 (the fixing belt module 86) and the pressurizing roller 88.

The fixing belt module 86 includes the heating belt 84, a heat-pressing roller 89, a support roller 90, a support roller 92, a trajectory correction roller 94, and a support roller 98. The heating belt 84 is wound around the heat-pressing roller 89 and the support roller 90. The heat-pressing roller 89 is driven to rotate by a driving motor (not illustrated) and presses the inner circumferential surface of the heating belt 84 toward the pressurizing roller 88. The support roller 92 is disposed on the outer side of the heating belt 84 and determines a circulating path of the heating belt 84. The trajectory correction roller 94 corrects the trajectory of the heating belt 84 in a region between the support roller 90 and the heat-pressing roller 89, and meandering of the heating belt 84 is thereby controlled. The support roller 98 applies tension to the heating belt 84 from its inner circumferential surface at a position downstream of the nip part N.

To reduce the sliding resistance between the inner circumferential surface of the heating belt 84 and the heat-pressing roller 89, a sheet-shaped sliding member 82 is disposed between the heating belt 84 and the heat-pressing roller 89. The sliding member 82 is disposed such that its opposite ends are supported by a support member 96.

A halogen heater 89A (an example of the heating means) is disposed inside the heat-pressing roller 89 and heats the heating belt 84 from its inner circumferential surface side.

A halogen heater 90A (an example of the heating means) is disposed inside the support roller 90 and heats the heating belt 84 from its inner circumferential surface side.

A halogen heater 92A (an example of the heating means) is disposed inside the support roller 92 and heats the heating belt 84 from its outer circumferential surface side.

The pressurizing roller 88 is rotatably supported and is pressed by urging means (not illustrated) against a portion of the heating belt 84 that is wound around the heat-pressing roller 89. As the heating belt 84 rotates and moves in the direction of an arrow S together with the rotation of the heat-pressing roller 89, the pressing roller 88 driven by the rotation and movement of the heating belt 84 rotates and moves in the direction of an arrow R.

A paper sheet K (an example of the recording medium) with an unfixed toner image placed thereon is transported in the direction of an arrow P and guided to the nip part N of the fixing device 80. When the paper sheet K passes through the nip part N, the unfixed toner image on the paper sheet K is fixed by pressure and heat.

<Image Forming Apparatus>

An image forming apparatus according to the present exemplary embodiment of the disclosure includes: image holding members; charging devices that charge the surfaces of the respective image holding members; electrostatic latent image forming devices that form electrostatic latent images on the charged surfaces of the respective image holding members; developing devices that develop the electrostatic latent images formed on the surfaces of the image holding members with respective developers containing toners; transferring devices that transfer the toner images onto a surface of a recording medium; and the fixing device according to the present exemplary embodiment of the disclosure that fixes the toner images onto the recording medium. The fixing device may be a cartridge detachable from the image forming apparatus.

Figure 3:
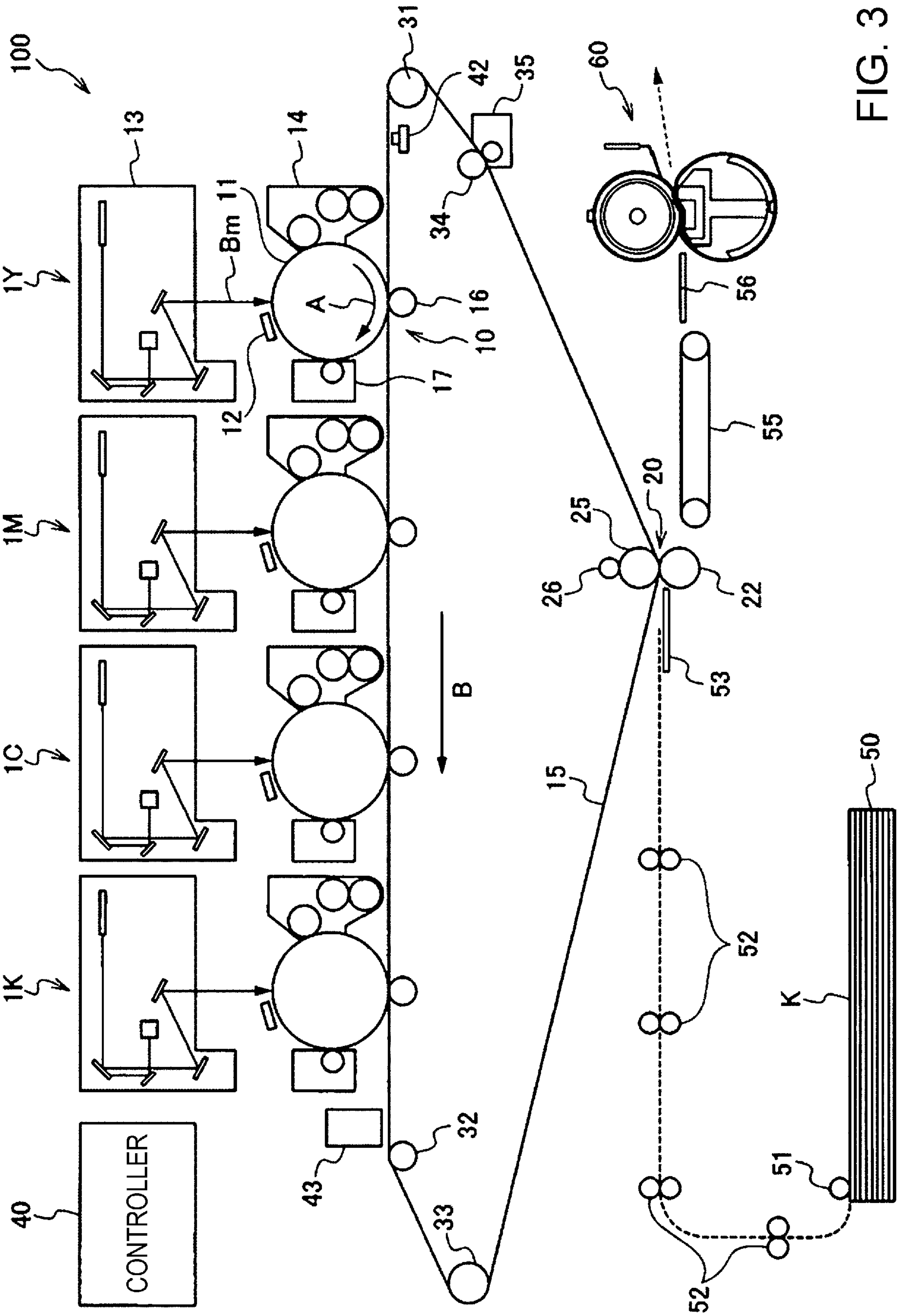
FIG. 3 is a schematic illustration showing an example of an image forming apparatus according to the exemplary embodiment of the disclosure.

FIG. 3 is a schematic illustration showing the structure of the image forming apparatus 100 according to the present exemplary embodiment. The image forming apparatus 100 includes the above-described fixing device 60 according to the first exemplary embodiment. The image forming apparatus 100 may include the above-described fixing device 80 according to the second exemplary embodiment instead of the fixing device 60.

The image forming apparatus 100 is an intermediate transfer-type image forming apparatus having a so-called tandem configuration. The image forming apparatus 100 includes: image forming units 1Y, 1M, 1C, and 1K that form toner images of respective colors by an electrophotographic process; first transfer units 10 that transfer (first-transfer) the color toner images sequentially onto an intermediate transfer belt 15; a second transfer unit 20 that transfers (second-transfers) all the superposed toner images transferred onto the intermediate transfer belt 15 at once onto a paper sheet K used as a recording medium; the fixing device 60 that fixes the second-transferred images onto the paper sheet K; and a controller 40 that controls the operation of each device (each unit).

The image forming units 1Y, 1M, 1C, and 1K are arranged substantially linearly in the order of 1Y (the yellow unit), 1M (the magenta unit), 1C (the cyan unit), and 1K (the black unit) from the upstream side of the intermediate transfer belt 15.

Each of the image forming units 1Y, 1M, 1C, and 1K includes a photoreceptor 11 (an example of the image holding member). The photoreceptor 11 rotates in the direction of an arrow A.

A charging unit 12 (an example of the charging device), a laser exposure unit 13 (an example of the electrostatic latent image forming device), a developing unit 14 (an example of the developing device), a first transfer roller 16, and a photoreceptor cleaner 17 are disposed around the photoreceptor 11 sequentially in the rotation direction of the photoreceptor 11.

The charging unit 12 charges the surface of the photoreceptor 11.

The laser exposure unit 13 emits an exposure beam Bm to form an electrostatic latent image on the photoreceptor 11.

The developing unit 14 contains a corresponding color toner and visualizes the electrostatic latent image on the photoreceptor 11 with the toner.

The first transfer roller 16 transfers the toner image formed on the photoreceptor 11 onto the intermediate transfer belt 15 in the first transfer unit 10.

The photoreceptor cleaner 17 removes the toner remaining on the photoreceptor 11.

The intermediate transfer belt 15 is a belt formed of a material prepared by adding an antistatic agent such as carbon black to a resin such as polyimide or polyamide. The intermediate transfer belt 15 has a volume resistivity of, for example, $1\times10^{6}$ Ω·cm or more and $1\times10^{14}$ Ω·cm or less and has a thickness of, for example, 0.1 mm.

The intermediate transfer belt 15 is supported by a driving roller 31, a support roller 32, a tension applying roller 33, a back roller 25, and a cleaning back roller 34 and driven to circulate (rotate) in the direction of an arrow B together with the rotation of the driving roller 31.

The driving roller 31 is driven by a motor (not illustrated) having a good constant speed property to rotate the intermediate transfer belt 15.

The support roller 32 together with the driving roller 31 supports the intermediate transfer belt 15 extending substantially linearly in the arrangement direction of the four photoreceptors 11.

The tension applying roller 33 applies constant tension to the intermediate transfer belt 15 and serves as a correction roller for preventing meandering of the intermediate transfer belt 15

The back roller 25 is disposed in the second transfer unit 20, and the cleaning back roller 34 is disposed in a cleaning unit for scraping off the toners remaining on the intermediate transfer belt 15.

Each first transfer roller 16 is disposed so as to be pressed against the corresponding photoreceptor 11 with the intermediate transfer belt 15 therebetween to form the corresponding first transfer unit 10.

A voltage (first transfer bias) with a polarity opposite to the charge polarity of the toner (negative polarity, the same applies to the following) is applied to each of the first transfer rollers 16. Therefore, the toner images on the photoreceptors 11 are electrostatically attracted to the intermediate transfer belt 15 in a sequential manner, and the toner images are superposed on the intermediate transfer belt 15.

Each first transfer roller 16 is a cylindrical roller including a shaft (e.g., a cylindrical rod made of a metal such as iron or SUS) and an elastic layer (e.g., a sponge layer formed of a rubber blend containing a conducting agent such as carbon black) fixed around the shaft. The first transfer roller 16 has a volume resistivity of, for example, $1\times10^{7.5}$ Ω·cm or more and $1\times10^{8.5}$ Ω·cm or less.

A second transfer roller 22 is disposed so as to be pressed against the back roller 25 with the intermediate transfer belt 15 therebetween and forms the second transfer unit 20 together with the back roller 25.

A second transfer bias is formed between the second transfer roller 22 and the back roller 25, and the second transfer roller 22 second-transfers the toner images onto a paper sheet K (recording medium) transferred to the second transfer unit 20.

The second transfer roller 22 is a cylindrical roller including a shaft (e.g., a cylindrical rod made of a metal such as iron or SUS) and an elastic layer (e.g., a sponge layer formed of a rubber blend containing a conducting agent such as carbon black) fixed around the shaft. The second transfer roller 22 has a volume resistivity of, for example, $1\times10^{7.5}$ Ω·cm or more and $1\times10^{8.5}$ Ω·cm or less.

The back roller 25 is disposed on the back side of the intermediate transfer belt 15 and forms a counter electrode of the second transfer roller 22, and a transfer electric field is formed between the back roller 25 and the second transfer roller 22.

The back roller 25 is formed, for example, by coveting a rubber substrate with a rubber blend tube containing carbon dispersed therein. The back roller 25 has a surface resistivity of, for example, $10^{7}$ Ω/sq or more and $10^{10}$ Ω/sq or less and a hardness of, for example, 70° (ASKER C manufactured by Kobunshi Keiki Co., Ltd., the same applies to the following).

A metallic feeding roller 26 is disposed in contact with the back roller 25. The feeding roller 26 applies a voltage (second transfer bias) with the same polarity as the charge polarity (negative polarity) of the toner, and a transfer electric field is formed between the second transfer roller 22 and the back roller 25.

An intermediate transfer belt cleaner 35 is disposed downstream of the second transfer unit 20 along the intermediate transfer belt 15 so as to be separable from the intermediate transfer belt 15. The intermediate transfer belt cleaner 35 removes the toners and paper powder remaining on the intermediate transfer belt 15 after the second transfer.

A reference sensor (home position sensor) 42 is disposed upstream of the image forming unit 1Y. The reference sensor 42 generates a reference signal used as a reference for image formation timings in the image forming units. When the reference sensor 42 detects a mark provided on the back side of the intermediate transfer belt 15, the reference sensor 42 generates the reference signal. The controller 40 issues instructions based on the reference signal to start image formation in the image forming units 1Y, 1M, 1C, and 1K.

An image density sensor 43 for image quality adjustment is disposed downstream of the image forming unit 1K.

The image forming apparatus 100 includes, as transport means for transporting a paper sheet K, a paper sheet container 50, a paper feed roller 51, transport rollers 52, a transport guide 53, a transport belt 55, and a fixation entrance guide 56.

The paper sheet container 50 contains paper sheets K with no image formed thereon.

The paper feed roller 51 picks up the paper sheets K contained in the paper sheet container 50.

The transport rollers 52 transport each paper sheet K fed by the paper feed roller 51.

The transport guide 53 feeds the paper sheet K transported by the transport rollers 52 to the second transfer unit 20.

The transport belt 55 transports, to the fixing device 60, the paper sheet K on which an image has been transferred in the second transfer unit 20.

The fixation entrance guide 56 guides the paper sheet K to the fixing device 60.

An image forming method in the image forming apparatus 100 will be described.

In the image forming apparatus 100, image data outputted from, for example, an image reading device (not illustrated) or a computer (not illustrated) is subjected to image processing in an image processing device (not illustrated), and image forming operations are performed in the image forming units 1Y, 1M, 1C, and 1K.

In the image processing device, the inputted reflectance data is subjected to image processing such as shading compensation, misregistration correction, lightness/color space transformation, gamma correction, frame erasure, color editing, and move editing. The image data subjected to the image processing is converted to four types of color tone data including Y color data, M color data, C color data, and K color data, and they are outputted to the respective laser exposure units 13.

In each of the laser exposure units 13, the photoreceptor 11 of a corresponding one of the image forming units 1Y, 1M, 1C, and 1K is irradiated with an exposure beam Bm according to the inputted color tone data.

In each of the image forming units 1Y, 1M, 1C, and 1K, the surface of the photoreceptor 11 is charged by the charging unit 12 and is then scanned and exposed using the laser exposure unit 13, and an electrostatic latent image is thereby formed. The electrostatic latent images formed on the photoreceptors 11 are developed in the respective image forming units to form respective color toner images.

The toner images formed on the photoreceptors 11 of the image forming units 1Y, 1M, 1C, and 1K are transferred onto the intermediate transfer belt 15 in the first transfer units 10 in which the photoreceptors 11 come into contact with the intermediate transfer belt 15. In each of the first transfer units 10, a voltage (first transfer bias) with a polarity opposite to the charge polarity (negative polarity) of the toner is applied by the first transfer roller 16 to the intermediate transfer belt 15. The toner images are thereby sequentially superposed onto the intermediate transfer belt 15.

The toner images first-transferred onto the intermediate transfer belt 15 are transferred to the second transfer unit 20 as the intermediate transfer belt 15 moves. At the timing when the toner images reach the second transfer unit 20, a paper sheet K contained in the paper sheet container 50 is transferred by the paper feed roller 51, the transport rollers 52, and the transport guide 53, supplied to the second transfer unit 20, and held between the intermediate transfer belt 15 and the second transfer roller 22.

In the second transfer unit 20 with the transfer electric field formed therein, the toner images on the intermediate transfer belt 15 are electrostatically transferred (second-transferred) onto the paper sheet K.

The paper sheet K with the toner images electrostatically transferred thereonto is peeled off from the intermediate transfer belt 15 by the second transfer roller 22 and transferred to the fixing device 60 by the transport belt 55.

The paper sheet K transferred to the fixing device 60 is heated and pressurized in the fixing device 60, and the unfixed toner images are thereby fixed.

Through the above steps in the image forming apparatus 100, an image is formed on the recording medium.

EXAMPLES

The exemplary embodiments of the disclosure will be described in detail by way of Examples, but the exemplary embodiments of the disclosure are not limited to the Examples.

In the following description, "parts" and "%" are based on mass, unless otherwise specified.

In the following description, synthesis, treatment, production, etc. are performed at room temperature (25° C.±3° C.), unless otherwise specified.

Production of Films

Example 1

A polyamic acid solution (solid content: 18%, U-Imide varnish KX-R manufactured by UNITIKA Ltd.), a needle-shaped filler 1 (carbon nanotubes), and a plate-shaped filler 1 (graphite) are mixed and kneaded using a three-roll mill to prepare a coating solution (1). The total content (% by volume) of the electrically conductive filler and the ratios (% by volume) of the needle-shaped filler 1 and the plate-shaped filler 1 in the electrically conductive filler are shown in Table 1. When the polyamic acid solution and the electrically conductive filler are kneaded, the distances between the rolls of the roll mill and the rotation speed of the roll mill are adjusted to control the dispersion state of the electrically conductive filler in the coating solution.

The coating solution (1) is applied to the outer circumferential surface of an aluminum-made cylindrical mold (diameter: 168 mm). During the application of the coating solution, the gap between a flat plate and a film applicator and the application speed (mm/s) are adjusted to control the dispersion state of the electrically conductive filler in the coating.

Next, the cylindrical mold having the coating thereon is placed in a heating furnace and heated to a temperature of 320° C. to fire the film. The application amount of the coating solution (1) is adjusted such that the film has an average film thickness of 80 μm. The cylindrical mold underneath the film is pulled off, and a tubular film is thereby obtained.

Examples 2 to 6 and 8

Films are obtained using the same procedure as in Example 1 except that the electrically conductive filler used is changed to include a filler A and a filler B shown in Table 1 and that the total content (% by volume) of the electrically conductive filler and the ratios (% by volume) of the fillers A and B in the electrically conductive filler are changed to values shown in Table 1.

Example 7

A film is obtained using the same procedure as in Example 1 except that the electrically conductive filler is changed to a filler A shown in Table 1 and that the total content (% by volume) of the electrically conductive filler is changed to a value shown in Table 1.

Comparative Examples 1 to 4

Films are obtained using the same procedure as in Example 1 except that the electrically conductive filler is changed to a filler A shown in Table 1 and that the total content (% by volume) of the electrically conductive filler is changed to a value shown in Table 1.

In Comparative Example 3, when the polyamic acid solution and the electrically conductive filler are kneaded, the distance between the rolls of the roll mill is adjusted to be smaller than that in Example 1, and the rotation speed of the roll mill is adjusted to be faster than that in Example 1. Moreover, when the coating solution is applied, the gap between the flat plate and the film applicator is adjusted to be smaller than that in Example 1, and the application speed (mm/s) is adjusted to be faster than that in Example 1.

<Determination of Contents of Electrically Conductive Fillers in Films>

For each of the films obtained in the Examples and Comparative Examples, the content of the electrically conductive filler is determined.

A cuboidal piece is cut from a central portion, with respect the axial direction, of the film. The cuboidal piece has edges extending in the axial direction, the circumferential direction, and the thickness direction, has a length of 1 mm in the circumferential direction, and is elongated in the axial direction. Then the cuboidal piece is embedded in an epoxy resin. The embedded piece is subjected to cross-sectional processing using a microtome to form a block cross section at which a cross section in the thickness direction appears. The specimen having the block cross section formed therein is fixed to a specimen table of an FIB-SEM apparatus (FIB-SEM Helios NanoLab 600i, U.S. FEI Company) and subjected to vapor deposition treatment. In the FIB-SEM apparatus, the FIB processing and the SEM observation of the block cross section are repeated to obtain a 2D image stack. The FIB processing and the SEM observation are repeated until at least 30 filler particles are observed. The SEM observation is performed at a magnification at which filler particles dispersed in the film can be observed.

The 2D image stack is analyzed using 3D image analysis software (Avizo-Fire, VSG) to form a 3D image. Whether the electrically conductive filler particles included in the 3D image formed are needle-shaped filler particles, spherical filler particles, or plate-shaped filler particles is determined (i.e., the ratio of the lengths along the X, Y, and Z axes of each particle is determined). Moreover, the contents (% by volume) of the needle-shaped filler, the spherical filler, and the plate-shaped filler are determined.

<Physical Properties of Films>

For each of the films obtained in the Examples and Comparative Examples, the volume resistivity and the surface resistivity are measured.

The volume resistivity (ohm·cm) at a measurement voltage of 0.1 V, the volume resistivity (ohm·cm) at a measurement voltage of 0.02 V (ohm·cm), the surface resistivity (ohm/sq) at a measurement voltage of 0.1 V, and the surface resistivity (ohm/sq) at a measurement voltage of 0.02 V are measured using R8340A manufactured by Advantest as an ammeter and a UR-SS probe as a measurement probe. The measurement results are shown in Table 2.

The applied voltage dependence of the volume resistivity (i.e., the difference between the volume resistivity measured at a measurement voltage of 0.02 V and the volume resistivity measured at a measurement voltage of 0.1 V) and the applied voltage dependence of the surface resistivity (i.e., the difference between the surface resistivity measured at a measurement voltage of 0.02 V and the surface resistivity measured at a measurement voltage of 0.1 V) are also shown in Table 2.

<Thermal Conductivity of Films>

A square piece having a length of 2 mm in the axial direction and a length of 2 mm in the circumferential direction is cut from one of the films and used as a measurement specimen. A thermal diffusivity measurement apparatus ai-Phase (manufactured by ai-Phase Co., Ltd.) is used to measure the thermal diffusivity at room temperature (25° C.±3° C.). The thermal diffusivity is multiplied by the specific heat and the density to compute the thermal conductivity (W/(m·K)). The computed thermal conductivity is rated as follows.

A: 10 W/(m·K) or more

B: 7.0 W/(m·K) or more and less than 10 W/(m·K)

C: less than 7.0 W/(m·K)

TABLE 1

| | Total | Filler A | | | Filler B | | |
|---|---|---|---|---|---|---|---|
| | amount of filler [% by volume] | Type of filler | Content [% by volume] | Ratio in filler [% by volume] | Type of filler | Content [% by volume] | Ratio in filler [% by volume] |
| Example 1 | 55% | Needle-shaped filler 1 | 35% | 64% | Plate-shaped filler 1 | 20% | 36% |
| Example 2 | 70% | Needle-shaped filler 1 | 35% | 50% | Plate-shaped filler 1 | 35% | 50% |
| Example 3 | 65% | Needle-shaped filler 1 | 50% | 77% | Plate-shaped filler 1 | 15% | 23% |
| Example 4 | 70% | Needle-shaped filler 1 | 50% | 71% | Plate-shaped filler 1 | 20% | 29% |
| Example 5 | 70% | Needle-shaped filler 1 | 50% | 71% | Spherical filler 1 | 20% | 29% |
| Example 6 | 90% | Needle-shaped filler 1 | 40% | 44% | Plate-shaped filler 1 | 50% | 56% |
| Example 7 | 55% | Needle-shaped filler 1 | 55% | 100% | None | | 0% |
| Comparative Example 1 | 35% | Spherical filler 2 | 35% | 100% | None | | 0% |
| Comparative Example 2 | 50% | Spherical filler 3 | 50% | 100% | None | | 0% |
| Comparative Example 3 | 40% | Plate-shaped filler 2 | 40% | 100% | None | | 0% |
| Comparative Example 4 | 35% | Needle-shaped filler 1 | 35% | 100% | None | | 0% |

TABLE 2

| | Physical properties of polymer film | | | | | | |
|---|---|---|---|---|---|---|---|
| | Volume resistance | | | Surface resistance | | | |
| | Voltage dependence of volume resistivity [ohm · cm] | Volume resistivity at 0.02 V [ohm · cm] | Volume resistivity at 0.1 V [ohm · cm] | Voltage dependence of surface resistivity [ohm/sq] | Surface resistivity at 0.02 V [ohm/sq] | Surface resistivity at 0.1 V [ohm/sq] | Evaluation Thermal conductivity in thickness direction |
| Example 1 | 220 | 1000 | 780 | 700 | 1500 | 800 | A |
| Example 2 | 100 | 700 | 600 | 800 | 1400 | 600 | A |
| Example 3 | 350 | 900 | 550 | 650 | 1200 | 550 | A |
| Example 4 | 100 | 700 | 600 | 400 | 1000 | 600 | A |
| Example 5 | 100 | 700 | 600 | 400 | 1000 | 600 | A |
| Example 6 | 600 | 700 | 100 | 300 | 800 | 500 | B |
| Example 7 | 600 | 900 | 300 | 200 | 300 | 100 | B |
| Comparative Example 1 | 700 | 2000 | 1300 | 140 | 200 | 60 | C |
| Comparative Example 2 | 5000 | 25000 | 20000 | 500 | 2500 | 2000 | C |
| Comparative Example 3 | 700 | 1900 | 1200 | 180 | 150 | 330 | C |
| Comparative Example 4 | 700 | 1500 | 800 | 180 | 600 | 420 | C |

The details of the fillers shown in Table 1 are as follows.

(Needle-Shaped Filler)

Needle-shaped filler 1: Carbon nanotubes, product name: VGCF-H, manufacture: Resonac, average fiber length: 4 μm (Plate-Shaped Fillers)

Plate-shaped filler 1: graphite, product name: UP-15N, manufacture: Nippon Graphite, average particle diameter: 15 μm Plate-shaped filler 2: graphene nanoplatelets, product name: GNZ-XC, manufacture: Graphene Platform Corp.

(Spherical Fillers)

Spherical filler 1: spheroidal graphite, product name: CGB-12R, manufacture: Nippon Graphite, average particle diameter: 12 μm Spherical filler 2: product name: Denka Black, manufacture: Denka Spherical filler 3: product name: Special Black 4, manufacture: Orion Engineered Carbons The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1))) A film containing: at least one macromolecular compound selected from the group consisting of resins and rubbers; and an electrically conductive filler including at least a needle-shaped filler and dispersed in the macromolecular compound, wherein the content of the electrically conductive filler is 40% by volume or more.

(((2))) The film according to (((1))), wherein the film has a volume resistivity of 1,000 ohm·cm or less as measured at a measurement voltage of 0.1 V, and wherein the applied voltage dependence of the volume resistivity that is defined as the difference between the volume resistivity measured at a measurement voltage of 0.02 V and the volume resistivity measured at a measurement voltage of 0.1 V is 600 ohm·cm or less.

(((3))) The film according to (((2))), wherein the applied voltage dependence of the volume resistivity that is defined as the difference between the volume resistivity measured at a measurement voltage of 0.02 V and the volume resistivity measured at a measurement voltage of 0.1 V is 300 ohm·cm or less.

(((4))) The film according to any one of (((1))) to (((3))), wherein the applied voltage dependence of a surface resistivity that is defined as the difference between the surface resistivity measured at a measurement voltage of 0.02 V and the surface resistivity measured at a measurement voltage of 0.1 V is 200 ohm/sq or more.

(((5))) The film according to (((4))), wherein the applied voltage dependence of the surface resistivity that is defined as the difference between the surface resistivity measured at a measurement voltage of 0.02 V and the surface resistivity measured at a measurement voltage of 0.1 V is 400 ohm/sq or more.

(((6))) The film according to any one of (((1))) to (((5))), wherein the content of the electrically conductive filler is 60% by volume or more.

(((7))) The film according to any one of (((1))) to (((6))), wherein the content of the electrically conductive filler is 80% by volume or less.

(((8))) The film according to (((7))), wherein the content of the electrically conductive filler is 70% by volume or less.

(((9))) The film according to any one of (((1))) to (((8))), wherein the electrically conductive filler further includes at least one of a spherical filler and a plate-shaped filler.

(((10))) The film according to (((9))), wherein the total amount of the spherical filler and the plate-shaped filler with respect to the total amount of the electrically conductive filler is 20% by volume or more and 60% by volume or less.

(((11))) The film according to (((10))), wherein the total amount of the spherical filler and the plate-shaped filler with respect to the total amount of the electrically conductive filler is 30% by volume or more and 50% by volume or less.

(((12))) The film according to any one of (((1))) to (((11))), wherein the needle-shaped filler is a carbon material filler.

(((13))) A tubular fixing member including the film according to any one of (((1))) to (((12))).

(((14))) A fixing device including: a first rotatable member; and a second rotatable member disposed in contact with an outer surface of the first rotatable member, wherein at least one of the first rotatable member and the second rotatable member is the tubular fixing member according to (((13))), and wherein a recording medium having an image formed on a surface thereof is caused to pass through a contact portion between the first rotatable member and the second rotatable member to fix the toner image.

(((15))) An image forming apparatus including:

an image holding member;

a charging device that charges a surface of the image holding member;

an electrostatic latent image forming device that forms an electrostatic latent image on the charged surface of the image holding member;

a developing device that develops the electrostatic latent image formed on the surface of the image holding member with a developer containing a toner to thereby form a toner image;

a transferring device that transfers the toner image onto a surface of a recording medium; and the fixing device according to (((14))) that fixes the toner image to the recording medium.

What is claimed is:

1. A film comprising:

at least one macromolecular compound selected from the group consisting of resins and rubbers; and an electrically conductive filler including at least a needle-shaped filler and at least one of a spherical filler or a plate-shaped filler, the electrically conductive filler being dispersed in the macromolecular compound, wherein the content of the electrically conductive filler is 55% by volume or more and 70% by volume or less.

2. The film according to claim 1, wherein the film has a volume resistivity of 1,000 ohm·cm or less as measured at a measurement voltage of 0.1 V, and wherein the applied voltage dependence of the volume resistivity that is defined as the difference between the volume resistivity measured at a measurement voltage of 0.02 V and the volume resistivity measured at a measurement voltage of 0.1 V is 600 ohm·cm or less.

3. The film according to claim 2, wherein the applied voltage dependence of the volume resistivity that is defined as the difference between the volume resistivity measured at a measurement voltage of 0.02 V and the volume resistivity measured at a measurement voltage of 0.1 V is 300 ohm·cm or less.

4. A tubular fixing member comprising the film according to claim 3.

5. A tubular fixing member comprising the film according to claim 2.

6. The film according to claim 1, wherein the applied voltage dependence of a surface resistivity that is defined as the difference between the surface resistivity measured at a measurement voltage of 0.02 V and the surface resistivity measured at a measurement voltage of 0.1 V is 200 ohm/sq or more.

7. The film according to claim 6, wherein the applied voltage dependence of the surface resistivity that is defined as the difference between the surface resistivity measured at a measurement voltage of 0.02 V and the surface resistivity measured at a measurement voltage of 0.1 V is 400 ohm/sq or more.

8. A tubular fixing member comprising the film according to claim 7.

9. A tubular fixing member comprising the film according to claim 6.

10. The film according to claim 1, wherein the content of the electrically conductive filler is 60% by volume or more.

11. A tubular fixing member comprising the film according to claim 10.

12. The film according to claim 1, wherein the total amount of the spherical filler and the plate-shaped filler with respect to the total amount of the electrically conductive filler is 20% by volume or more and 60% by volume or less.

13. The film according to claim 12, wherein the total amount of the spherical filler and the plate-shaped filler with respect to the total amount of the electrically conductive filler is 30% by volume or more and 50% by volume or less.

14. The film according to claim 1, wherein the needle-shaped filler is a carbon material filler.

15. A tubular fixing member comprising the film according to claim 1.

16. A fixing device comprising:

a first rotatable member; and a second rotatable member disposed in contact with an outer surface of the first rotatable member, wherein at least one of the first rotatable member and the second rotatable member is the tubular fixing member according to claim 15, and wherein a recording medium having an image formed on a surface thereof is caused to pass through a contact portion between the first rotatable member and the second rotatable member to fix the toner image.

17. An image forming apparatus comprising:

an image holding member;

a charging device that charges a surface of the image holding member;

an electrostatic latent image forming device that forms an electrostatic latent image on the charged surface of the image holding member;

a developing device that develops the electrostatic latent image formed on the surface of the image holding member with a developer containing a toner to thereby form a toner image;

a transferring device that transfers the toner image onto a surface of a recording medium; and the fixing device according to claim 16 that fixes the toner image to the recording medium.

* * * * *